(12) United States Patent
Haviala

(10) Patent No.: US 8,504,000 B2
(45) Date of Patent: Aug. 6, 2013

(54) MANAGING CONNECTIONS IN A MOBILE TELECOMMUNICATIONS NETWORK

(75) Inventor: Kalle Haviala, Tampere (FI)

(73) Assignee: Nokia Corporation, Espoo (FI)

( * ) Notice: Subject to any disclaimer, the term of this patent is extended or adjusted under 35 U.S.C. 154(b) by 1066 days.

(21) Appl. No.: 11/617,862

(22) Filed: Dec. 29, 2006

(65) Prior Publication Data

US 2007/0238452 A1 Oct. 11, 2007

(30) Foreign Application Priority Data

Apr. 7, 2006 (GB) .................................. 0607084.1

(51) Int. Cl.
*H04W 36/00* (2009.01)
*H04W 4/00* (2009.01)

(52) U.S. Cl.
USPC ........................... 455/418; 455/436; 370/331

(58) Field of Classification Search
USPC 455/418, 426.2, 517, 436; 379/191; 370/331, 370/338, 328
See application file for complete search history.

(56) References Cited

U.S. PATENT DOCUMENTS

| | | | |
|---|---|---|---|
| 3,586,785 A | 6/1971 | Feiner | |
| 7,551,583 B1 * | 6/2009 | Gazzard | 370/331 |
| 2002/0082033 A1 * | 6/2002 | Lohtia et al. | 455/517 |
| 2004/0259542 A1 * | 12/2004 | Viitamaki et al. | 455/426.2 |
| 2005/0070283 A1 * | 3/2005 | Hashimoto et al. | 455/435.1 |
| 2005/0281216 A1 * | 12/2005 | Varonen et al. | 370/328 |
| 2006/0003775 A1 * | 1/2006 | Bull et al. | 455/456.1 |
| 2006/0098597 A1 * | 5/2006 | Kurzmann et al. | 370/331 |
| 2006/0234709 A1 * | 10/2006 | Marinescu et al. | 455/436 |
| 2006/0245404 A1 * | 11/2006 | Bajic | 370/338 |

OTHER PUBLICATIONS

3GPP TS 24.008 V7.3.0, Mar. 30, 2006, "3rd Generation Partnership Project; Technical Specification Group Core Network and Terminals; Mobile radio interface Layer 3 specification; Core Network protocols; Stage 3 (Release 7)". 534 pages. Retrieved from the Internet: http://www.3gpp.org/ftp/Specs/archive/24_series/24.008/24008-730.zip.

International Search Report of PCT/IB2007/000960—Date of Completion of Search: Feb. 19, 2008.

3GPP TSG RAN Meeting #13, Beijing, China, Sep. 18-21, 2001, "R1-01-0923 Change Request 2 3.7.0", http://www.3gpp.org/ftp/tsg_ran/TSG_RAN/TSGR_13/Docs/PDFs/RP-010709.pdf, downloaded on Sep. 3, 2006, 6 pages.

* cited by examiner

*Primary Examiner* — Nizar Sivji
(74) *Attorney, Agent, or Firm* — Locke Lord LLP

(57) ABSTRACT

A method of managing a data transmission in a telecommunications network, said method comprising: monitoring the data transmission associated with a connection; saving information associated with the data transmission; and after a discontinuity in the data transmission, the connection is maintained or released based on the saved information.

16 Claims, 2 Drawing Sheets

MANAGING CONNECTIONS IN A MOBILE TELECOMMUNICATIONS NETWORK

This application claims the benefit of British Patent Application No. 0607084.1, filed Apr. 7, 2006, which is hereby incorporated by reference.

FIELD OF THE INVENTION

The present invention relates to methods of managing connections, mobility of a user equipment and handovers in a mobile telecommunications network. The present invention also relates to a telecommunications network, a network entity, a transceiver, and a user equipment adapted to implement the aforementioned methods. Preferred embodiments of the present invention relate to packet-switched services in cellular networks and in particular to a packet-switched handover procedure for a mobile station changing cells.

BACKGROUND OF THE INVENTION

A communication system can be seen as a facility that enables communication sessions between two or more entities such as user equipment and/or other nodes associated with the communication system. The communication may comprise, for example, communication of voice, data, multimedia and so on. Communication systems providing wireless communication for user equipment are known. Cellular communication systems are configured to have a cell structure, and typically they support communication with user equipment changing locations (mobile users). The support for communications for mobile users may include support for handing existing connections from one cell to another cell. At least routing of calls or communications for a mobile user in a new cell is typically supported in cellular systems. Some examples of a cellular system are the Global System for Mobile Telecommunications (GSM) and General Packet Radio Service (GPRS).

Packet-switched networks are those in which relatively small units of data called packets are routed through the network based on a destination address contained within each packet. Breaking communication down into packets allows the same data path to be shared among many users in the network. GPRS provides packet-switched data services and utilizes the infrastructure of a GSM network.

A cellular network is a radio network of individual cells, known as base stations. Each base station covers a small geographical area, and is uniquely identified by a location area code. By integrating the coverage of each of these base stations, a cellular network provides radio coverage over a very much wider area. A group of base stations is called a location area, or a routing area.

A "location area" is a set of base stations that are grouped together to optimise signalling. Typically, 10 s or even 100 s of base stations share a single controller, for example a Base Station Controller (BSC). The controller handles allocation of radio channels, receives measurements from the mobile phones, and controls handovers from base station to base station.

To each location area, a unique number called a "location area code" is assigned. The location area code is broadcast by each base station at regular intervals. A location update procedure allows a mobile device to inform the cellular network, whenever it moves from one area to the next. The user equipment are responsible for detecting location area codes. When a user equipment finds that the location area code is different from its last update, it performs another update by sending to the network, a location update request.

A "routing area" is a subdivision of a "location area". Routing areas are used by mobiles which are using packet-switched data services. The bursty nature of packet traffic means that more paging messages are expected per mobile, and so it is worth to know the location of the mobile more accurately than it would be with traditional circuit-switched traffic. A change from routing area to routing area (called a "Routing Area Update" (RAU)) is done in an almost identical way to a change from location area to location area. The main difference is that an element such as a "Serving GPRS Support Node" (SGSN) or similar is involved. A RAU procedure thus allows a mobile device to inform the cellular network, whenever it moves from one routing area to the next served by a different SGSN. Mobiles are responsible for detecting routing area codes. When a mobile finds that the routing area code is different from its last update, it performs another update by sending to the network, a RAU request.

A handover minimizes the service interruption times by allowing continuous data transfer between a user equipment and a cellular system when the user equipment is moving from one cell to another cell. A packet-switched handover may be an intra-SGSN handover or an inter-SGSN handover. In an intra-SGSN handover, the source and target base station are controlled by the same SGSN. In an inter-SGSN handover, the source base station is controlled by a first (source) SGSN and the target base station is controlled by a second (target) SGSN.

A GPRS mobile will perform a Routing Area Update in the Ready and Standby state. The RAU is triggered when the mobile crosses a RA (Routing Area) boundary, or periodically with the time interval being set by the network. A RAU is also performed when the mobile moves from the Idle to the Standby state. This will typically happen when the mobile is powered on.

A packet data protocol (PDP) context refers to information sets held in the user equipment and GPRS Supporting Nodes (GSNs) that are used to bind the user equipment to a PDP address that identifies an application, PDP type and a QoS (Quality of Service) profile. That is, the PDP context is a logical association between a user equipment and PDN (Public Data Network) running across a GPRS network. defining aspects such as Routing, QoS, Security, Billing etc. PDP context functions are discussed in 3GPP TS29.060.

Other types of packet switched networks are known. For example, Universal Mobile Telecommunications System (UMTS) is one of the third-generation (3G) mobile phone technologies. The supporting nodes in this system may be designated 3G-GSNs with the serving support node designated 3G-SGSN. In UMTS, a packet switched signalling connection is a peer-to-peer UMTS connection between the user equipment and 3G-SGSN. It consists of an RRC (Radio Resource Control) connection and an LU connection. In 3G mobile phone technologies, the interface between the access node and a node in the core network is denoted as an LU interface. Over the LU interface, connections can be established according to the LU user plane protocol.

The packet switched signalling connection is needed in UMTS packet domain in order to send signalling messages (e.g. Activate PDP Context Requests) or user data. 3G-SGSN may release the packet switched signalling connection after a GMM (GPRS Mobility Management) specific signalling procedure (e.g. Routing Area Update) or it can prolong the connection for the following activity.

3GPP TS 24.008 describes how the mobile station can request the network to prolong an established packet switched signalling connection using GMM protocol signalling with a follow-on request (FOR) mechanism. If the user equipment wishes to prolong the established packet switched signalling connection, it sets a follow-on request pending indicator (a FOR bit) in a GMM signalling message. If the user equipment does not want to prolong the connection, it doesn't set the follow-on request pending indicator. Networks should prolong the packet switched signalling connection if the mobile station has indicated a follow-on request pending, but they may also prolong the connection without any indication from the mobile station. If a packet switched signalling connection is released, it is re-established with a Service Request procedure.

In current mobile phones the FOR bit is always set if a PDP context(s) is active regardless of whether there is user data transfer ongoing. This means that PS signalling connection might get prolonged without any reason. Thus in current networks the packet switched signalling connection might be prolonged for many hours if the FOR bit is set even if the user data transfer never continues after RAU. This obviously wastes the network resources and also drains out the battery of the user equipment.

On the other hand if the FOR bit is not set, even if there is user data transfer ongoing, the packet switched signalling connection might get released. A user will notice this as a break in the data transfer. The break is caused by the release and re-establishment of the packet switched signalling connection. In the current implementation of the networks this might take several seconds.

The present invention aims to solve the aforementioned problem.

SUMMARY OF THE INVENTION

The present inventors have deduced that the FOR bit should be set in a RAU request message for prolonging the established packet switched signalling connection only if user data transfer is to be continued after RAU. Having deduced this, the problem becomes how to decide whether or not user data transfer is to be continued after RAU.

The present inventors have solved this problem by providing data buffers which can save information relating to previous data transfer and use this information for estimating the need to set the FOR bit. Such an arrangement has the advantageous features of extended battery life of the user equipment and improved usage of radio resources through better feasibility for networks to release the packet switched signalling connection after RAU. In the prior art arrangements there are no data buffers (uplink or downlink) arranged to save information relating to previous data transfer and use this information for estimating the need to set the FOR bit.

Although the aforementioned solution relates to the focus areas of mobility management and handovers, the present inventors have also realised that the inventive concept behind this solution is the assessment of continuation of user data transmission according to simple history data. This inventive concept can be applied to any situation in which, after discontinuity, it is necessary to assess whether an activity preceding the interruption will continue.

In light of the above, according to a first aspect of the present invention there is provided a method of managing a data transmission in a telecommunications network, said method comprising: monitoring the data transmission associated with a connection; saving information associated with the data transmission; and after a discontinuity in the data transmission, the connection is maintained or released based on the saved information.

The present inventors have realised that in many situations a connection in a telecommunications network is maintained after a discontinuity when the connection is no longer required for data transmission. This wastes network resources and also can drain the battery of user equipment. In other situations a connection in a telecommunications network is released after a discontinuity when the connection is still required for data transmission. A user will notice this as a break in the data transfer. The break is caused by the release and re-establishment of the connection, e.g. the packet switched signalling connection. This might take several seconds. By saving information associated with the data transmission and maintaining or releasing the connection based on this saved information after a discontinuity in the data transmission, the aforementioned problems are avoided.

Preferably, the connection is a packet switched signalling connection. Due to the bursty nature of packet traffic in prior art arrangements it is difficult to know whether a connection should be maintained or released. Accordingly, the present invention is particularly useful for packet switched connections.

Preferably, the connection is between a mobile user equipment and a network entity. Problems of lowering power consumption are particularly important for mobile user equipment so as to maintain battery life. Accordingly, the present invention is particularly useful for implementation in a mobile user equipment. In one embodiment, the connection is between a mobile user equipment and a serving support node of the telecommunications network. The mobile user equipment may be arranged to save the information associated with the data transmission.

In one embodiment, the discontinuity is a handover. This may be, for example, a handover between base stations or a handover between serving nodes. The connection may be maintained or released based on the saved information after a mobility management signalling procedure such as a routing area update or a location area update. It has been found to be useful to make a decision as to whether to maintain or release a connection during a mobility management signalling procedure, for example, a GMM (GPRS Mobility Management) specific signalling procedure. In one particularly preferred arrangement, the connection is maintained or released by setting the state of a follow-on request pending indicator. This may be set in a request message. For example, a request message from a mobile user equipment such as a Routing Area Update request message. If the follow-on request pending indicator is set then the connection is maintained, otherwise the connection is released.

According to an embodiment of the invention, the information associated with the data transmission comprises information about the time at which data transmissions, for example, data packets, are sent or received over the connection. If a time elapsed after a last data transmission has been sent or received over the connection is greater than a specified value than the packet switched connection can be released. It is envisaged that if the time elapsed after the last data transmission is greater than a specified value then further data transmissions associated with the connect are not expected and the connection does not need to be maintained. A timer may be used for measuring the time interval since a last data transmission. This timer may be located in a mobile user equipment.

According to a second aspect of the present invention there is provided a method of managing a handover of a mobile user equipment between a first network entity and a second network entity in a telecommunications network, said method comprising: monitoring the data transmission associated with a connection between the mobile user equipment and the first network entity; saving information associated with the data transmission; sending a handover request message to the second network entity, said request message containing an indicator which is set according to the saved information; and maintaining the connection with the second network entity or releasing the connection based on the indicator.

Preferably, the method of managing a handover comprises one or more of the features discussed in relation to the first aspect of the invention. In particular, in accordance with one embodiment, the saved information is associated with the time at which data packets of a packet switched connection are sent between the mobile user equipment and the first network entity. A request message is sent to the second network entity containing an indicator set according to the time at which a last data packet was sent between the mobile station and the first network entity. If a difference between a time the request message was sent and the time the last data packet was sent is less than a specified value then the packet switched signalling connection is maintained between the second network entity and the mobile station, whereas, if the difference between the time the request message was sent and the time the last data packet was sent is greater than the specified value than the packet switched signalling connection is released. The connection is maintained or released based on the indicator.

According to another aspect of the present invention there is provided a method of managing a transceiver in a telecommunications network, the transceiver having an active state in which the transceiver is capable of transmitting data and a passive state in which the transceiver is not capable of transmitting data, said method comprising: monitoring data transmitted or received by the transceiver; saving information associated with the transmitted or received data; and after a discontinuity in the transmitted or received data, setting the transceiver to the active state or the passive state based on the saved information.

The aforementioned method is advantageous for reducing the power consumption of the transceiver while still maintaining good performance characteristics. The transceiver will remain in the active state if it is envisaged that further data is to be transmitted so as to avoid a break in data transfer. However, the method prevents the transceiver from being unduly kept in the active state when no further data transfer is to take place in the near future so as to avoid undue power consumption which can, for example, drain the battery of a mobile user equipment.

Preferably, the method of managing a transceiver comprises one or more of the features discussed in relation to the aforementioned aspects of the invention. Most preferably, the transceiver is located in a mobile user equipment. Thus, according to another aspect of the present invention there is provided a method of managing a mobile user equipment in a telecommunications network, the mobile user equipment having an active state in which the mobile user equipment is capable of transmitting data and a passive state in which the mobile user equipment is not capable of transmitting data, said method comprising: monitoring data transmitted or received by the mobile user equipment; saving information associated with the transmitted or received data; and after a discontinuity in the transmitted or received data, setting the mobile user equipment to the active state or the passive state based on the saved information.

According to a further aspect of the present invention there is provided a telecommunications network comprising: a processor for monitoring a data transmission associated with a connection; and a buffer for saving information associated with the data transmission, the telecommunications network being arranged to maintain or release the connection after a discontinuity in the data transmission based on the saved information.

According to a another aspect of the present invention there is provided a mobile user equipment, the mobile user equipment having an active state in which the mobile user equipment is capable of transmitting data and a passive state in which the mobile user equipment is not capable of transmitting data, the user equipment being arranged to monitor data transmitted or received by the mobile user equipment and comprising a buffer for saving information associated with the transmitted or received data, the user equipment being arranged to enter the active state or the passive state based on the saved information after a discontinuity in the transmitted or received data.

Preferably, the mobile user equipment is arranged: to send a request message containing an indicator which is set according to the saved information; and be switched into the active state or the passive state based on the indicator. Preferably, the mobile user equipment is arranged to maintain or release a connection based on the saved information as described in relation to other aspects of the invention. That is, the active state may correspond to a mobile user equipment being connected with a network entity whereas the passive state may correspond to an unconnected mobile user equipment.

BRIEF DESCRIPTION OF THE DRAWINGS

For a better understanding of the present invention and to show how the same may be carried into effect, embodiments of the present invention will now be described by way of example only with reference to the accompanying drawings, in which.

DETAILED DESCRIPTION OF THE PREFERRED EMBODIMENTS OF THE INVENTION

The invention will be described in relation to packet switched services in a cellular system, and in particular, the implementation where a follow-on request pending indicator is set in a RAU request message according to history information. In a particularly preferred embodiment, the invention is implemented in a 3G-GPRS system. However, it will be understood that the present invention is not limited to this particular implementation.

Figure 1:
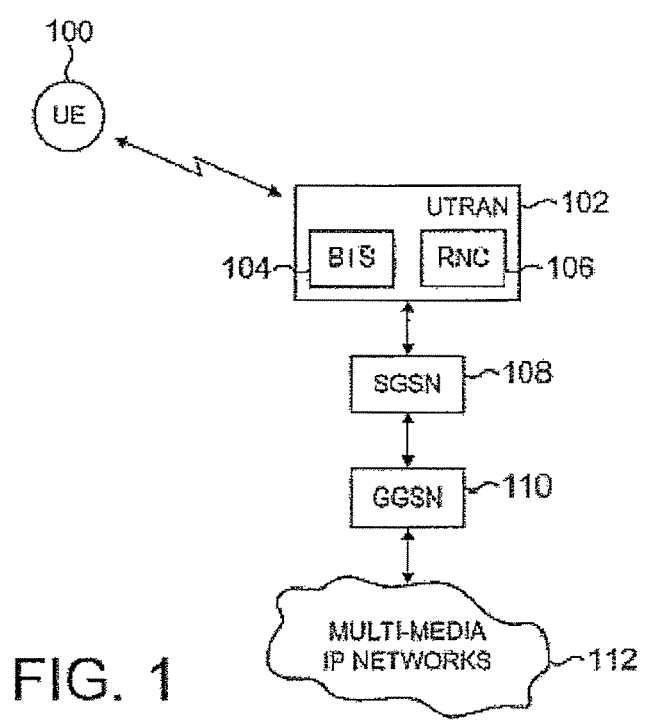
FIG. 1 shows schematically a cellular communication system with which embodiments of the invention can be used.

Referring to FIG. 1, there is illustrated the main elements of a UMTS network. It should be noted that FIG. 1 does not represent a full implementation of a UMTS network, which implementation will be familiar to one skilled in the art. Rather, FIG. 1 represents some of the main elements of such a UMTS network necessary for placing the present invention into an appropriate context.

A user equipment (UE) 100 communicates over a radio interface with a UTRAN (UMTS radio access network) 102. As is known in the art, the UTRAN 102 includes a base transceiver station (BTS) 104 and a radio network controller (RNC) 106. In the UMTS network the UTRAN 102 is connected to a serving GPRS support node (SGSN) 108, which in turn is connected to a gateway GPRS support node (GGSN)

110. The GGSN 110 is further connected to at least one external network, e.g. multimedia IP network, represented by reference numeral 112 in FIG. 1. Both the SGSN and the GGSN may be considered to be network elements.

In general terms, a PDP context is activated in order to establish a logical connection between a user equipment and the GGSN.

In known implementations, the UE 100 initiates a logical connection by requesting a PDP context activation by transmitting session management messages to the SGSN 108 via the UTRAN 102. Responsive thereto, the SGSN 108 requests RAB (radio access bearer) establishment from the RNC 106 using the radio access network application protocol (RANAP). The SGSN 108 also requests PDP context creation with GPRS tunneling protocol (GTP) from the GGSN 110. This procedure is repeated for each PDP context which the UE 100 requires.

As well as requesting PDP context activation, the UE 100 may also request secondary PDP context activations, PDP context modifications, or PDP context deactivations. The specific implementation of PDP context activations, secondary PDP context activations, PDP context modifications, and PDP context deactivations is well known in the art.

Embodiments of the present invention which can be implemented in the previously described system are now described in more detail.

Embodiments of the present invention define a state machine for setting the FOR pending indicator in the RAU request message. Simple history information is utilizes for this the idea being based on the premise that if user data transfer was ongoing a short period of time (e.g. a few seconds) before RAU, it most probably will continue after RAU. There are many possible ways to implement the state machine in question.

Figure 2:
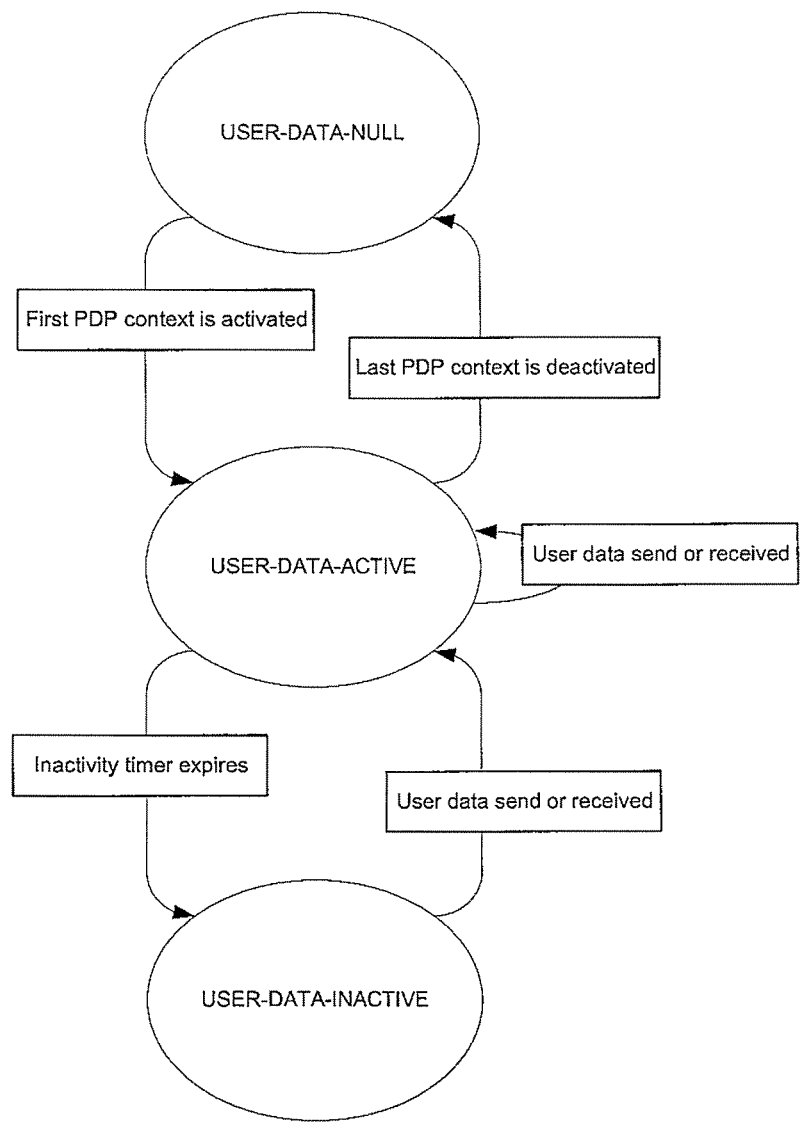
FIG. 2 shows user data activity states for controlling the FOR bit in accordance with an embodiment of the present invention.

FIG. 2 shows a schematic diagram of one such state machine. Initially (i.e. after power on) the MS is in the USER-DATA-NULL state. In this state user data transfer in not possible. There are no PDP context(s) and radio bearer(s) that enable user data transfer. The MS leaves this state when the first PDP context is activated and returns when the last PDP context is deactivated. If RAU happens when the MS is in the USER-DATA-NULL state, the FOR bit is not set.

When the MS enters the USER-DATA-ACTIVE state it starts the USER-DATA-INACTIVITY timer. This timer is restarted after every user data packet that is received from the network or from the application(s) running in the MS. The MS stays in the USER-DATA-ACTIVE state while there is user data transfer ongoing. If RAU happens when the MS is in the USER-DATA-ACTIVE state, the FOR bit is set.

When the USER-DATA-INACTIVITY timer expires the MS enters the USER-DATA-INACTIVATE state. The MS stays in the USER-DATA-INACTIVATE state when there is not any user data transfer ongoing. If RAU happens when the MS is in the USER-DATA-INACTIVE state, the FOR bit is not set.

The USER-DATA-INACTIVITY timer should be as short as possible to give the best efficiency, but it also needs to be long enough so that the MS does not enter to the USER-DATA-INACTIVE state during data transfer. Five seconds should be suitable for most of internet applications.

There are many possible ways to implement the state machine described above. In one implementation of a mobile user equipment, the mobile user equipment saves the arrival time of the last user data packet that is received from the network or from the application(s) running in the MS. When RAU happens, the GMM layer asks for the arrival time of the last user data packet and compares it to the current time. If the difference between the time of the last user data packet and the current time is smaller than the value of the USER-DATA-INACTIVITY timer, the GMM layer sets the follow-on request bit on. Otherwise, the GMM layer does not set the follow-on request bit.

This invention improves the usage of radio resources, because it gives more feasibility for networks to release the packet switched signalling connection after RAU. This might be significant for operators which have configured their GPRS network in several routing areas and/or where routing area updates are likely to happen. Embodiments of the present invention are particularly useful when a user has always-online type of application(s) running in the MS (i.e. PDP context(s) is always active).

If the value of the USER-DATA-INACTIVITY timer is too short the packet switched signalling connection might get released even it should not have been released. This might be possible if an application (running in the MS) requests or receives data from the network periodically, that is less frequent than the USER-DATA-INACTIVITY timer. But these kind of an applications are never real time and therefore the additional delay caused by the service request procedure is not important.

It is envisaged that embodiments of the present invention will be very important from a user's point of view. In the near future most mobiles will be GPRS attached and most likely will also have a PDP context active (like H3G AOL currently). Without this invention, the mobile's battery will be quickly drained dead if cruising on a highway/motorway with frequent change of routing area or UTRAN (UMTS Terrestrial Radio Access Network) executing RNC relocations. This problem has been seen many times in live networks. Embodiments of the present invention achieve a more accurate FOR setting mechanism by the GMM layer.

The network may choose which state the mobile user equipment should be in. When data is transferred, the mobile user equipment is usually in the DCH (Dedicated Channel) state. In this state, the transmitter in the mobile user equipment is on, which consumes battery power. The network may tell the mobile to go to the FACH (Forward Access Channel) state, and then to the PCH (Paging Channel) state after a certain amount of time (the FACH state can transmit data at lower power and the PCH state supports efficient sleep-mode procedures). The decision is done based on the network understanding of the mobile user equipment activity, but the more quickly this is done, the better is the battery life. In accordance with embodiments of the present invention, when a Routing Area Update occurs, there is a chance for the mobile user equipment to tell the network what kind of state it is in. If the mobile user equipment sets the Follow On Request bit on, it tells to the network that it plans to do something. If the mobile user equipment does not set the Follow On Request bit on, it tells the network that it is acceptable for the phone to go to a non-transmitting state.

Since returning from non-transmitting state may take some time, current mobile user equipment set the FOR bit always on. However, there are some commercial networks (for example some H3G networks) which do not change the mobile user equipment state from DCH at all, if the FOR bit is set on. This means that if a user lives near the border of two routing areas, or travels frequently over the borders, the battery life of the mobile user equipment will be somewhat shorter. Currently the battery life of 3G phones is somewhat short, so there is certainly room for improvement, and embodiments of this invention provide such an improvement.

As an alternative to the timer implemented solution previously described, according to another embodiment of the present invention the status of a buffer associated with a connection may be used to determine whether the connection should be maintained or released. However, since the packet data has a bursty nature, the buffer status may not give sufficient information on which to base a decision in some situations.

The required data processing functions may be provided by means of one or more data processor entities. All required processing may be provided in the mobile user equipment. Appropriately adapted computer program code product may be used for implementing the embodiments, when loaded to a computer or processor. The program code product for providing the operation may be stored on and provided by means of a carrier medium such as a carrier disc, card or tape. A possibility is to download the program code product via a data network. Implementation may be provided with appropriate software in a mobile user equipment.

While this invention has been particularly shown and described with reference to preferred embodiments, it will be understood to those skilled in the art that various changes in form and detail may be made without departing from the scope of the invention as defined by the appendant claims.

The invention claimed is:

1. A method, comprising:
monitoring a data transmission associated with a packet switched connection between mobile user equipment and a first network entity;
saving information associated with the data transmission;
sending a routing area update message to a second network entity, said routing area update message containing a follow-on request indicator which is set according to the saved information, wherein the saved information indicates data which is to continue after the routing area update; and
participating in maintaining the connection, wherein the connection is maintained based on the follow-on request indicator, and wherein the connection is maintained after a handover of the mobile user equipment from the first network entity to the second network entity,
wherein each step of the method is performed by the mobile user equipment, and
wherein the saved information relates to a state of a buffer associated with the connection.

2. The method according to claim 1, wherein the saved information is the time at which data packets of the packet switched connection are sent between the mobile user equipment and the first network entity, the follow-on request indicator being set if a difference between a time the routing area update message was sent and the time the last data packet was sent is less than a specified value.

3. The method according to claim 2, wherein if the follow-on request indicator is set in the routing area update message the packet switched connection is maintained between the mobile user equipment and the first network entity after the routing area update message; and
if the follow-on request indicator is not set in the routing area update message then the packet switched connection is released.

4. The method according to claim 1, wherein the first network entity and the second network entity are first and second serving nodes, respectively.

5. The method according to claim 1, wherein the data transmission comprises a transmission of user data.

6. A computer program product comprising program code stored in a non-transitory computer readable storage medium, the program code being adapted to perform the method of claim 1 when the program code is run on a computer or on a processor.

7. A telecommunications network, comprising:
a processor configured to monitor a data transmission associated with a packet switched connection; and
a buffer for saving information associated with the data transmission, the telecommunications network being configured to set a follow-on request indicator in a routing area update message according to the saved information, wherein the saved information indicates data which is to continue after the routing area update, and to participate in maintaining the packet switched connection, wherein the connection is maintained based on the follow-on request indicator, and wherein the connection is maintained after a handover in the data transmission, and
wherein the saved information relates to a state of a buffer associated with the connection.

8. A telecommunications network according to claim 7, wherein the connection is between a mobile user equipment and a network entity.

9. A telecommunications network according to claim 8, wherein the connection is between the mobile user equipment and a serving support node of the telecommunications network.

10. A telecommunications network according to claim 8, wherein the mobile user equipment is arranged to save the information associated with the data transmission.

11. A telecommunications network according to claim 7, wherein the handover is between base stations.

12. A telecommunications network according to claim 7, wherein the handover is between serving nodes.

13. An apparatus, comprising:
at least one processor; and
at least one memory including computer program code, the at least one memory and the computer program code configured to, with the at least one processor, cause the apparatus at least to:
monitor a data transmission associated with a packet switched connection between the apparatus and a first network entity;
save information associated with the data transmission;
send a routing area update message to a second network entity, said routing area update message containing a follow-on request indicator which is set according to the saved information, wherein the saved information indicates data which is to continue after the routing area update; and
participate in maintaining the connection, wherein the connection is maintained based on the follow-on request indicator, and wherein the connection is maintained after a handover of the apparatus from the first network entity to the second network entity,
wherein the apparatus is a mobile user equipment, and
wherein the saved information relates to a state of a buffer associated with the connection.

14. The apparatus according to claim 13, wherein the monitored data is transmitted or received by the apparatus to or from the first network entity and the routing area update message is sent to the second network entity.

15. The apparatus according to claim 14, wherein the first network entity and the second network entity are first and second serving nodes, respectively.

16. The apparatus according to claim 15, wherein the data transmitted or received by the apparatus comprises user data.

* * * * *